United States Patent
Bush, III et al.

(10) Patent No.: US 10,228,916 B2
(45) Date of Patent: Mar. 12, 2019

(54) PREDICTIVE OPTIMIZATION OF NEXT TASK THROUGH ASSET REUSE

(71) Applicant: International Business Machines Corporation, Armonk, NY (US)

(72) Inventors: Hobert Bush, III, Raleigh, NC (US); Geoffrey M. Hambrick, Round Rock, TX (US); Damarius Hayes, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 15/191,189

(22) Filed: Jun. 23, 2016

(65) Prior Publication Data
US 2017/0371715 A1   Dec. 28, 2017

(51) Int. Cl.
| | |
|---|---|
| *G06F 8/36* | (2018.01) |
| *G06F 9/50* | (2006.01) |
| *G06N 7/00* | (2006.01) |
| *G06F 9/48* | (2006.01) |

(Continued)

(52) U.S. Cl.
CPC ............... *G06F 8/36* (2013.01); *G06F 9/449* (2018.02); *G06F 9/4881* (2013.01); *G06F 9/5033* (2013.01); *G06F 17/248* (2013.01); *G06N 7/005* (2013.01)

(58) Field of Classification Search
CPC ........ G06F 9/5033; G06F 9/4881; G06F 8/36; G06F 9/449; G06F 17/248
See application file for complete search history.

(56) References Cited

U.S. PATENT DOCUMENTS

| | | | |
|---|---|---|---|
| 2002/0188537 A1 | 12/2002 | Leeds et al. | |
| 2007/0033567 A1* | 2/2007 | Carlson | G06F 8/36 |
| | | | 717/100 |

(Continued)

FOREIGN PATENT DOCUMENTS

| | | |
|---|---|---|
| WO | 0022518 A1 | 4/2000 |
| WO | 0073893 A3 | 12/2000 |
| WO | 2010105368 A1 | 9/2010 |

OTHER PUBLICATIONS

Capps; The Quick Framework for Task-Specific Asset Prioritization in Distributed Virtual Environments, Virtual Reality, 2000. Proceedings. IEEE. IEEE, 2000.

(Continued)

*Primary Examiner* — Jacob D Dascomb
(74) *Attorney, Agent, or Firm* — Garg Law Firm, PLLC; Rakesh Garg; William Hartwell

(57) ABSTRACT

A first category is determined of a first task being performed at a given time. A first asset that is configured for use with the first category is identified. A next task object is constructed. By analyzing a set of tasks that were performed during a period prior to the given time, a candidate next task is identified. The candidate next task has been performed sometime after a previous performance of the first task during the period. From the first asset, a link to a second asset is selected. The second asset is configured for use with a second category of the candidate next task. The next task object is populated with the link. The candidate next task is designated as a second task that will occur sometime after the first task.

20 Claims, 8 Drawing Sheets

(51) Int. Cl.
  *G06F 9/448* (2018.01)
  *G06F 17/24* (2006.01)

(56) References Cited

U.S. PATENT DOCUMENTS

| | | | |
|---|---|---|---|
| 2008/0183514 A1* | 7/2008 | Moulckers | G06F 8/36 |
| | | | 705/304 |
| 2008/0270201 A1 | 10/2008 | Flaxer et al. | |
| 2009/0216581 A1 | 8/2009 | Carrier et al. | |
| 2012/0158530 A1 | 6/2012 | Shafiee et al. | |
| 2012/0158667 A1 | 6/2012 | Raju et al. | |
| 2013/0006952 A1* | 1/2013 | Wong | G06F 17/30867 |
| | | | 707/706 |
| 2014/0046892 A1* | 2/2014 | Gopalakrishnan | G06F 17/28 |
| | | | 706/46 |
| 2017/0329628 A1* | 11/2017 | Zhang | G06F 9/485 |

OTHER PUBLICATIONS

Basso et al., How do You Execute Reuse Tasks Among Tools?. Appendix p, 2016.

* cited by examiner

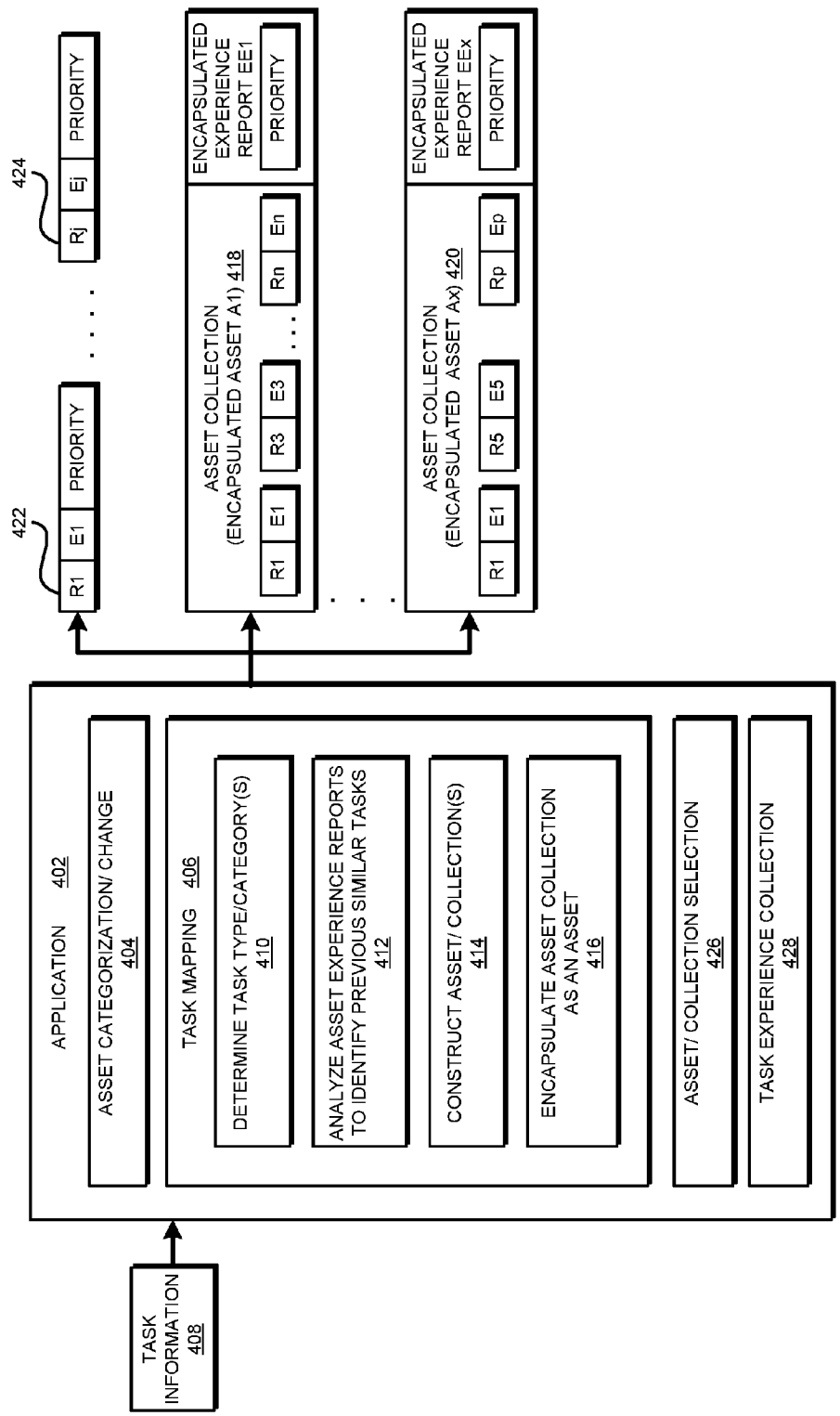

PREDICTIVE OPTIMIZATION OF NEXT TASK THROUGH ASSET REUSE

TECHNICAL FIELD

The present invention relates generally to a method, system, and computer program product for reusing assets in workflow management system. More particularly, the present invention relates to a method, system, and computer program product for predictive optimization of next task through asset reuse.

BACKGROUND

Within the scope of the illustrative embodiments, the workflow of a software development process comprises development or coding of computer usable software, testing of computer usable software, troubleshooting of computer usable software, maintenance of computer usable software, or update of computer usable software. A task refers to a specific step performed during the process, such as testing of computer usable software in software development. Hereinafter, unless expressly disambiguated where used, an "asset" is any reusable portion of—computer usable code, a previously performed task, a role or a user participating in a previously performed task, a solution developed in a previously performed task, a method applied in a previously performed task, a workflow or steps employed in a previously performed task, or some combination thereof.

Presently, one type of asset that is saved for future reuse is computer usable code or code fragment. When saved, the reusable code is stored in a code repository. A user intending to reuse the code extracts the code from the repository and uses the code as the user sees fit for the user's task. The user may or may not place any modifications to the extracted code back into the repository. Even when the modified code is placed back in the repository, rarely does any additional information, such as feedback or frequently asked questions, remain associated with the code.

SUMMARY

The illustrative embodiments provide a method, system, and computer program product. An embodiment includes a method that determines a first category of a first task being performed at a given time. The embodiment identifies a first asset that is configured for use with the first category. The embodiment constructs a next task object. The embodiment identifies, by analyzing a set of tasks that were performed during a period prior to the given time, a candidate next task, wherein the candidate next task has been performed sometime after a previous performance of the first task during the period. The embodiment selects, from the first asset, a link to a second asset, wherein the second asset is configured for use with a second category of the candidate next task. The embodiment populates the next task object with the link. The embodiment designates the candidate next task as a second task that will occur sometime after the first task.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 4A depicts a block diagram of a method for managing reuse of assets in a workflow management system in accordance with an illustrative embodiment;

DETAILED DESCRIPTION

Figure 1:
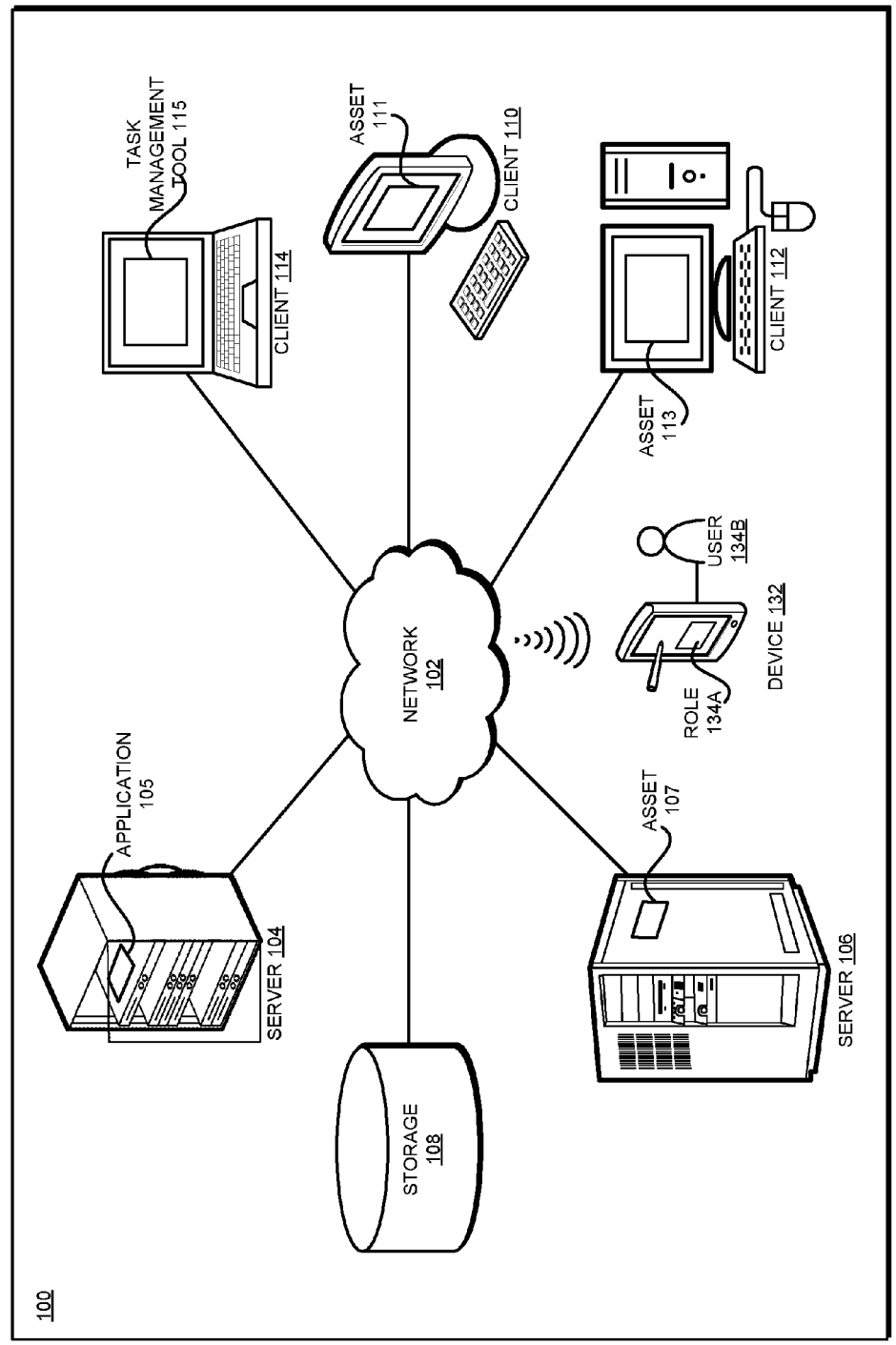
FIG. 1 depicts a block diagram of a network of data processing systems in which illustrative embodiments may be implemented.

The illustrative embodiments recognize that presently, even when an asset, such as a code fragment, is available for reuse, the reusing of existing code is viewed as effort-intensive, governance-heavy, and uncertainty-ridden proposition. The lack of accompanying information to facilitate the reuse is a big reason for this view. Furthermore, the potential re-users presently do not know which of the plurality of available reusable assets have been successfully applied to specific categories of problems with which the re-user is currently engaged.

The illustrative embodiments recognize that reuse of assets is generally desirable if the above described problems are addressed with a suitable model for reusing the assets. The reuse of existing assets becomes even more desirable when the assets can be not only reused in planned tasks, but are also enabled for predicting as yet unplanned tasks, problems that have not yet occurred, eventualities that have not yet materialized.

A planned task generally derives the conventional benefits from asset reuse, e.g., reduction in cost, conformity within a product or products, increased speed to market, and the like. The illustrative embodiments further recognize that a task management system can benefit from a predictive ability of the available assets by which an asset used in a present task or problem can predict a future task or problem, evaluate the possibility of an occurrence of such future task or problem, and proactively select one or more assets that are not only suitable for use with such future task or problem but can also optimize such future task or problem.

As an example, the optimization of a future task or problem includes reduction of work, time, or expense of the task. As another example, the optimization of a task can be replacement of the task with another task, or an elimination of the task altogether. In other words, one form of the optimization of a task can be preventative in which an adverse task—such as a future problem—can be prevented from occurring by taking proactive actions and/or proactively deploying assets. Another form of the optimization can be improvement in a desirable aspect of the task, a reduction in an undesirable aspect of the task, or both.

The illustrative embodiments used to describe the invention generally address and solve the above-described problems and other problems related to reusing a variety of assets in work flow driven processes such as software development.

An embodiment can be implemented as a software application. The application implementing an embodiment can be configured as a modification of an existing task planning system, as a separate application that operates in conjunction with an existing task management tool or system, a stand-alone application, or some combination thereof.

Within the scope of the illustrative embodiments, an asset can be created, stored, or located anywhere in a given environment and need not be brought into a managed repository for facilitating reuse. For example, when the asset is a code fragment, that code fragment can reside on any computer, in any storage, with or without the benefit of a code management library-type facility. As another example, when the asset is all or a portion of the result of a task, whether in plan, in progress, or previously performed, information of that task can reside in any suitable task management system anywhere in the given workflow management system. As another example, when the asset is all or a portion of a previously developed solution, method, or workflow, information of that solution, method, or workflow can reside in any suitable system anywhere in the given workflow management system.

An embodiment maintains a reference to an asset. A reference to an asset is an identifier, locator, pointer, or handle, which can be used to reach the asset at a location where the asset is normally stored or situated.

An embodiment maintains a set of experience reports with an asset. An experience report is a compilation of information in any suitable form or structure, where the information is indicative of a time when the asset was previously used in a task, a reason why the asset was chosen for a previous task, an actual manner in which the asset was used or reused in the previous task, an evaluation of the asset's suitability observed in the previous task on a scale, a notation of an aspect of the asset that was reused advantageously in the previous task, a notation of an aspect of the asset that could not be reused advantageously in the previous task, a modification performed relative to the asset to enable the reuse of the asset in the previous task, a modification that is recommended relative to the asset to enable the reuse of the asset in a future task, questions, positive and negative comments, issues that should be resolved with the asset, recommendations for improvements in the asset, alternatives that could be used or executed instead of the asset, or some combination thereof.

Note that a previous task can be any task prior to a task in which the reuse of the asset is contemplated. A future task can be the task in which the reuse of the asset is contemplated, or generally, any task that has not yet used the asset after the asset's use in a previous task. A next task of a task may be a future task that immediately follows the task or follows the task after one or more intervening tasks.

An embodiment enables a task to add or update an experience report associated with an asset when an input accepts the asset for reuse in the task, accesses the asset using a reference to the asset, and associates the referenced asset with the task. An embodiment collects information of any of the types described herein during the use of the asset in the task. For example, if the asset is modified during the reuse in the task, the embodiment prompts, requests, or otherwise obtains information to be added to an experience report of the asset. As a non-limiting example, the information can be about the modification, the suitability of the asset, a changed aspect of the asset, an advantage or a disadvantage that caused the modification, or a recommendation for further modification of the asset.

An embodiment uses the sets of experience reports associated with various reusable assets to select an asset for a task. Each reusable asset is categorized into one or more categories. A category associated with an asset is a category of a task in which the asset is usable. A category of a task is a class or type of a function to be performed in the task, an operation to be performed by the task, a goal to be achieved by the task, and the like.

As a non-limiting example, an embodiment determines one or more categories associated with the task for which reusable assets have to be located in the workflow management system. For example, a task may be to produce software that performs data storage management using data input and output functions, storage cleanup, data backup, and many other functions. One or more categories that could be determined for the task may include, data storage management, data input, data output, storage cleanup, and data backup.

An embodiment determines a category of the asset by analyzing one or more experience reports associated with the asset. For example, if according to an experience report from a previous task, the asset was used in a task of category—data input, the asset is categorized in the data input category. Any suitable manner of analyzing the available experience reports can be used to determine an asset category. For example, a value of a parameter in a structured experience report can be used, translated, or mapped to a category. As another example, a parse of unstructured experience report data using Natural Language Processing (NLP) can be used to determine a category for the asset.

These examples of methods for determining an asset category are not intended to be limiting. From this disclosure, those of ordinary skill in the art will be able to conceive many other methods for determining a category for the asset, and the same are contemplated within the scope of the illustrative embodiments.

Any number of categories can be associated with an asset. As new experience reports become associated with the asset, an existing experience report is revised, or some combination thereof, an embodiment reanalyzes the experience reports to determine a new category, change an existing category, or remove an old category associated with the asset. The categorization of an asset is therefore dynamic, and changes with the reuse in which the asset participates.

Furthermore, an embodiment computes a priority of the asset in a category. A priority of an asset in a category is indicative of a degree of fit or usability of the asset in the category. By analyzing an example collection of experience reports, an embodiment determines that the priority, or degree of usability, or degree of fit, of the asset in a particular task category.

An embodiment facilitates the reuse of assets in future tasks as follows—the embodiment receives information about a task, e.g., from a task management tool. In a task mapping operation, the embodiment determines a category of the task. In other words, the embodiment maps the task to one or more categories of tasks. New categories may be created during the task mapping process.

The embodiment determines assets that are categorized in that category. The embodiment arranges the assets in that category according to their respective priorities. The embodiment presents the sorted prioritized list of assets to the task management tool. The list includes references to the assets, wherever they might be located. The task management tool is also presented with the experience reports of the assets in the list so that the task planner can review the experience reports if needed.

The task management tool provides an input to the embodiment for selecting an asset from the list. Upon the input, the embodiment associates the selected asset for reuse in the task. The embodiment enables the task to add or modify an experience report of the asset from the time of the association up to and even after the time when the task is complete or up to some time prior to the completion of the task, as suitable in a particular implementation of the embodiment.

A task may use several assets. When presented with information about a task being planned, the embodiment determines from the experience reports of the various assets whether a set or collection of the assets has previously participated in a similar task. If a previous task similar to the task being planned has used a collection of assets, the embodiment selects that collection of assets. The embodiment further isolates experience reports created during the similar previous task for each participating asset in the collection. The experience reports isolated in this manner form encapsulated experience reports.

The embodiment represents the collection of assets and their experience reports as an encapsulated asset. The encapsulated asset has the encapsulated experience reports associated therewith.

The embodiment may find more than one collection that may have participated in different instances of similar previous tasks. Thus, the embodiment may create multiple encapsulated assets and their corresponding encapsulated experience reports. The embodiment determines the priorities of encapsulated assets in a manner similar to determining the priority of an asset, i.e., by analyzing the encapsulated experience reports of the encapsulated asset. Thus, a task management tool can select an individual asset for reuse, a collection of assets for reuse, or some combination of both, depending on the requirements of the task.

Another embodiment enables predicting a next task (T2) that will occur sometime after the task (T1) for which an asset or an encapsulated asset has been selected. The embodiment accomplishes this feature through asset sequencing. Certain asset sequencing operations are described herein with respect to an asset only for the clarity of the description and not to imply any limitation. An embodiment described with respect to an individual asset can be similarly used with an encapsulated asset within the scope of the illustrative embodiments.

Suppose that a repository of previous tasks is available. For example, a plan that includes T1 may have executed other tasks earlier, and such earlier executions may have included other instances of T1 or other tasks of the category of T1 (C1). As another example, an originator of t1—e.g., an originator of a problem ticket—may have originated other tasks of category C1 before T1. As another example, other plans or other originators may have created or executed either T1 or other tasks of category C1. Such previous creation and/or execution of tasks of category C1—including but not necessarily limited to T1—are available in the repository of previous tasks. Furthermore, in a manner described herein, the previous tasks in the repository have also contributed experience reports to the assets that were used in those previous tasks.

One embodiment sequences the assets as follows -suppose an asset (A1) is categorized for use with tasks in category C1. An embodiment analyzes the repository of the previous tasks to identify a category of task (C2) that has been performed after a task of category C1 in the past. For example, if the task is a problem of category C1 that is being solved using asset A1, the repository may reveal that in the past, a problem of category C2 has followed sometime after the problem of category C1.

An embodiment selects an asset (A2) that is usable in a task of category C2. For example, A2 may be selected based on the category C2 being associated with A2. Optionally, but not necessarily, the repository may reveal that the problem of category C2 has been solved using asset A2, causing an embodiment to select A2. Thus, based on past experience in task planning according to the repository, a task that uses asset A1 is followed by a task whose characteristics cause asset A2 to be used.

The embodiment associates, references, or otherwise links A2 from A1. In other words, a "next" link from an asset used in a present task points to an asset that will be usable in a next task that will follow the present task after some time. Recall that the next task may not have been planned or even known to the planner of the present task at the time of planning or performing the present task. Further recall that an asset may be usable to solve a task of a category by optimizing the task of that category. Several manners of optimizing a task are described herein, and an asset may optimize a task in one or more manners of optimization in order for the asset to be usable to solve the task.

Optionally, an embodiment associates, references, or otherwise links A1 from A2 as well. In other words, a "previous" link from an asset will be usable in a next task points to an asset that was used in a previous task that will precede the next task by some time.

Suppose that after a task of C1—which uses A1, a possibility exists that a task of C2 which uses A2 will follow, or a task of C3 which uses A3 will follow, or a task of C4 which uses A4 will follow. Furthermore, the repository of previous tasks may reveal that in six previous instances of a task of C1, three instances were followed by a task of C2, two instances were followed by a task of C3, and one instance was followed by a task of C4. A strength of a link between assets of two categories is determined by a function of a number of times a task of one category was followed by a task of the other category.

As a non-limiting example, in the above scenario, a link from A1 to A2 may be 3 strong, a link from A1 to A3 may be 2 strong, and a link from A1 to A4 may be 1 strong. As a generalized example, a next link from A1 to A2 may be f(3) strong, a next link from A1 to A3 may be f(2) strong, and a next link from Al to A4 may be f(1) strong, where f is some function.

Furthermore, a strength of a next link and a strength of a corresponding previous link are the same. For example, a previous link from A2 to A1 may also be f(3) strong, a previous link from A3 to A1 may also be f(2) strong, and a previous link from A4 to A1 may also be f(1) strong, where f is the same function as used to compute the strength of the next links.

Furthermore, consider the above example again—that in six previous instances of a task of C1, three instances were followed by a task of C2, two instances were followed by a task of C3, and one instance was followed by a task of C4. A probability of a link between assets of two categories is determined by a function of a number of times a task of one possible category was followed by a task of the other category as opposed to other possible alternatives.

In the above example, the probability of the next link (and the previous link) between A1 and A2 would be 3/6, i.e., 0.5, the probability of the next link (and the previous link) between A1 and A3 would be 2/6, i.e., 0.33, and the probability of the next link (and the previous link) between A1 and A4 would be 1/6, i.e., 0.17. Generally, the probability of the next link (and the previous link) between A1 and A2 would be w(3/6), i.e., w(0.5), the probability of the next link (and the previous link) between A1 and A3 would be w(2/6), i.e., w(0.33), and the probability of the next link (and the previous link) between A1 and A4 would be w(1/6), i.e., w(0.17), where w is a suitable function, such as but not limited to a weighting function.

A temporal distance is a distance in time between tasks of two linked categories. For example, a task of category C1 may be followed by a task of category C2 after x units of time, or after y number of intervening tasks, or after some other suitable measurement of time. In the above example, a temporal distance of a (next or previous) link between A1 and A2 may be 5 days implying that asset A2 can be expected to be used in a task of category C2 approximately 5 days after a task of category C1 uses asset A1. Alternatively, a temporal distance of a (next or previous) link between A1 and A2 may be 3 tasks implying that asset A2 can be expected to be used in a task of category C2 after approximately three intervening tasks of some categories after the task of category C1 that uses asset A1.

The probability that asset A2 will be needed after asset A1 can be indicative of not only the likelihood of a next task that can be expected to be performed but also of a task that can be avoided. For example, in a simplified example case, assume that task T1 is a task to apply a patch to an application, which is almost always followed by configuration update task T2. It is also known from historical occurrences that upon updating the configuration, a different kind of error comes up in a majority of instances of the patched application, which requires task T3 to apply another patch for the error and task T4 to reboot after the second patch.

It may be desirable to not reboot a system, such as a production environment system. Suppose that the first patch is applied by asset A1 at task T1 and the second patch is applied by asset A2 at task T3. Accordingly, an asset A1 might suggest using asset A2 before performing the configuration update task T2 so that reboot task T4 can be avoided.

Many other circumstances exist in which avoidance of a next task by selecting an appropriate sequence of assets, or performance or handling of the next task with increased efficiency might be desirable. An embodiment can be adapted for use in such circumstances, including the above example but not limited thereto, such that an asset A2 could be used after a task of type C1 in order to prevent the occurrence of a task of type C2 or to enable a more efficient performance of the task of type C2.

Thus, in an asset used in one category of tasks, an embodiment computes and adds a target of a next link—e.g., a reference to another asset which is expected to be used in another category of task that is expected to follow, a strength of that link, a probability of that link, and a temporal distance of that link. Optionally, one embodiment also adds in the other asset a corresponding previous link to the previous asset—e.g., a reference to the asset which the other asset is expected to follow, a strength of that link, a probability of that link, and a temporal distance of that link. Thus, an embodiment sequences the assets that are predicted to become usable in tasks of other categories that are predicted in a plan.

A task originator or a task management tool selects an asset, associates the asset with a present task, and begins using the asset in the present task. At some point in time during the selection, association, or use of the asset, an embodiment predictively adds or suggests a next asset for a next task. For example, the embodiment adds in the plan a next task object after the present task. Using a previous task repository, the embodiment identifies a category of the next task that is likely to occur in the plan or from the originator.

Using the identified category of the likely next task in the plan, the embodiment selects a subset of next links from the set of next links associated with the asset being used in the present task. The subset of next links point to one or more assets of the identified category of the likely next task. The embodiment populates the next task object in the plan with the subset of next links, or the assets pointed to by the subset of next links. Optionally, the embodiment also populates the next task object with the strength, probability, and temporal distance information associated with each next link populated into the next task object in the plan.

A method of an embodiment described herein, when implemented to execute on a device or data processing system, comprises substantial advancement of the functionality of that device or data processing system in predictively providing reusable assets for optimizing a forecasted next task in a workflow management system. For example, presently available methods are suitable only for limited types of assets that have to be evaluated for reuse when a task actually comes to a planning stage. A presently available method is unable to predict a reusable asset that will be useful in optimizing a task that has not even been planned yet. An embodiment provides a method for predictively reusing an asset in optimizing a forecasted task that can be expected in a workflow management system sometime after a present task. This manner of predictive reuse of assets for optimizing as yet unplanned future tasks in a workflow management system is unavailable in the presently available methods. Thus, a substantial advancement of such devices or data processing systems by executing a method of an embodiment is in increasing an informed reuse of a variety of types of assets in a workflow management system.

The illustrative embodiments are described with respect to certain types of assets, locations, references, times, experience reports, categories, priorities, tasks, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or their architectures, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
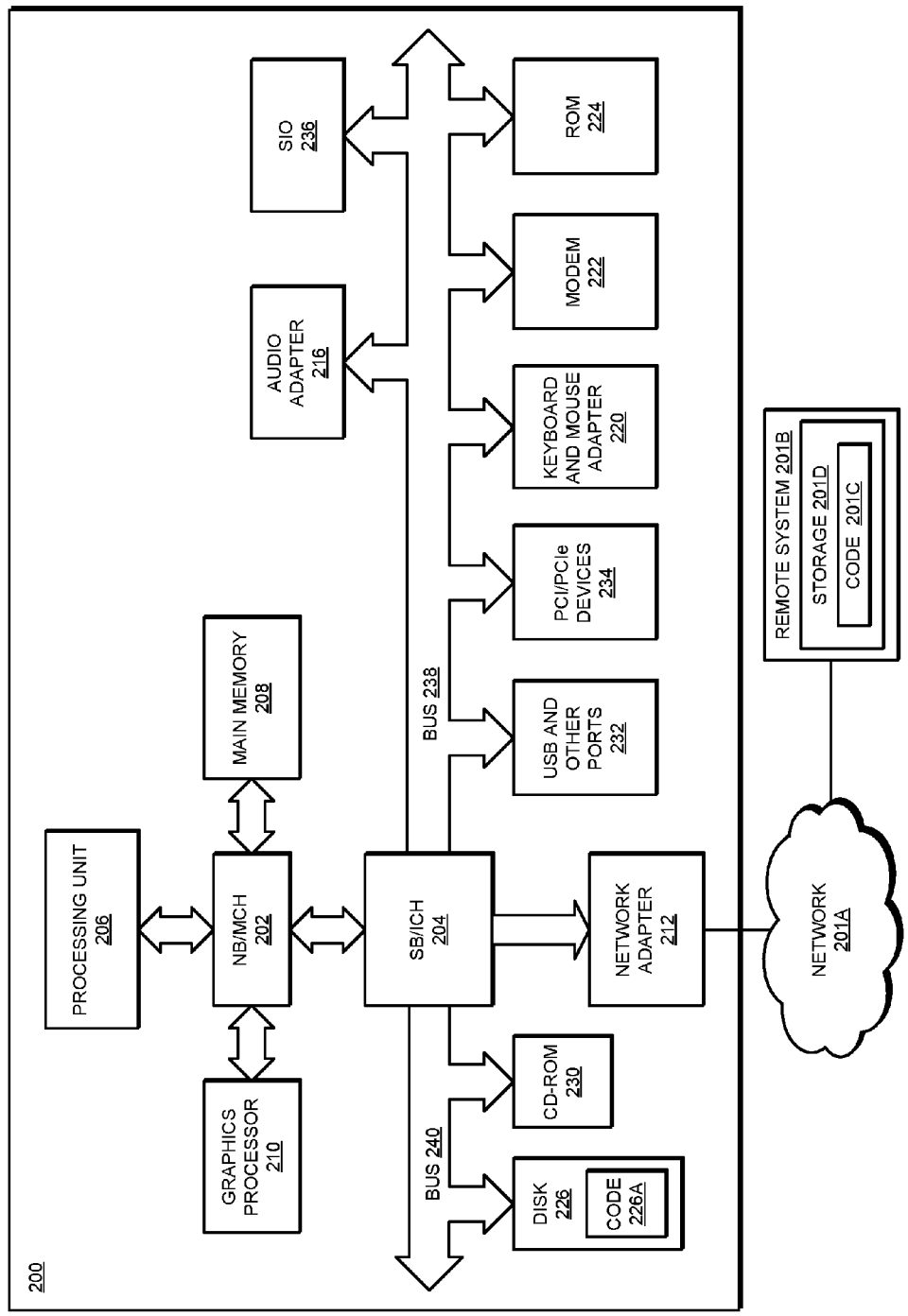
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. As some non-limiting examples, asset 107 may be an implementation of a workflow-type of an asset; asset 111 may be code-type of an asset; and asset 113 may be a previously performed task, solution, or method-type of an asset. Another example asset may be formed using role 134A associated with user 134B of device 132. Application 105 modifies one or more of asset 107, 111, or 113 with a set of next links, a set of previous links, one or more link strengths, probability values of one or more links, temporal distance of one or more links, or some combination thereof, as described herein. Task management tool 115 plans a task in which one or more assets described herein are to be reused. Application 105 creates a next task object in task management tool 115 in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-Page volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
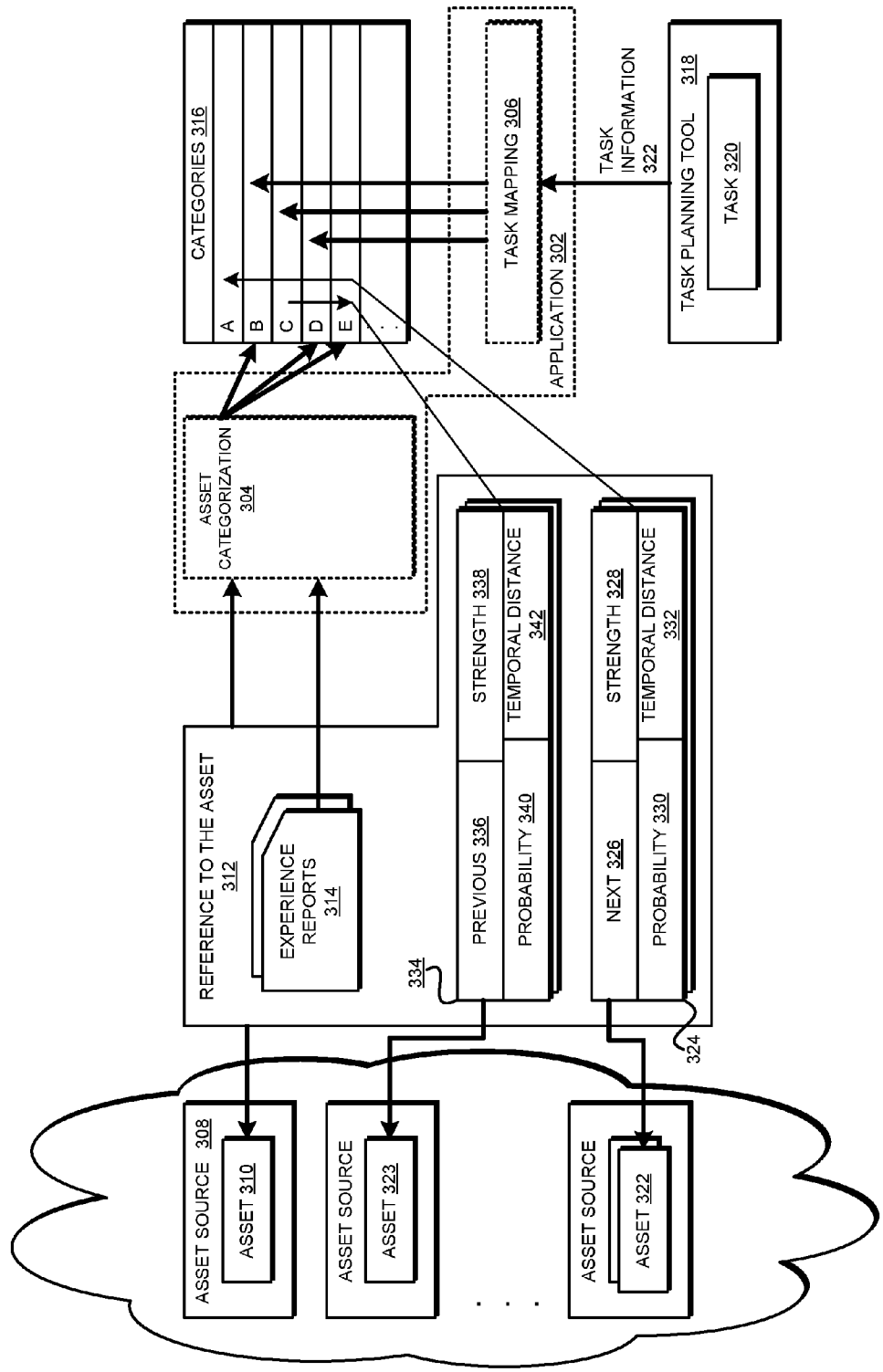
FIG. 3 depicts a block diagram of an example configuration for managing reuse of assets in a workflow management system in accordance with an illustrative embodiment.

With reference to FIG. 3, this figure depicts a block diagram of an example configuration for managing reuse of assets in a workflow management system in accordance with an illustrative embodiment. Application 302 is an example of application 105 in FIG. 1. Components 304 and 306 are parts of application 302.

Asset source 308 is an example of any of data processing systems 107, 110, 112, or 132 in FIG. 1. Asset source 308 is a storage other than a managed store or a managed library of assets. Asset 310 is a reusable asset stored in asset source 308. Any number of asset sources may be available in a given workflow management system, and each such source may share or make available any number and types of reusable assets therefrom as depicted.

Assume, only as a non-limiting example, that asset 310 is a code type asset. Application 302 constructs reference 312 to asset 310. Reference 312 does not move asset 310 into a managed store or library, but leaves asset 310 at its original location in source 308.

Application 302 also associates with reference 312 a set of experience reports 314. Component 304 analyzes experience reports 314 corresponding to asset 310 to determine one or more categories of asset 310. Assume only as a non-limiting example that list 316 is a current listing of categories according to the tasks that are being performed or have been performed in the workflow management system. Further assume that list 316 includes a number of example categories A, B, C, D, E, and so on.

Component 304 analyzes one or more of experience reports 314 to map asset 310 to one or more categories in list 316. For example, component 304 maps asset 310 to example categories B, D, and E as depicted.

Task management tool 318 is an example of task management tool 115 in FIG. 1. Assume that tool 318 is planning task 320, which has to be performed in the workflow management system. Tool 318 supplies task information 322 to component 306. Using task information 322, component 306 performs a task mapping operation in which task 320 is mapped to one or more categories in list 316. Task 320 may be mapped to an existing category, to a new category (not shown) created for task 320, or some combination thereof. As a non-limiting example, suppose that task 320 is mapped to existing categories B, C, and D, in list 316.

Up to this point in the process, application 302 has sufficient information to determine that asset 310 should be reusable in task 320 at least because of common categories B and D to which asset 310 and task 320 both map. A process according to an embodiment to determine whether asset 310 has a sufficient degree of usability in task 320—e.g., greater than a threshold degree of usability in task 320—is described with respect to FIG. 4A.

Application 302 associates with reference 312 the next and previous links as described herein. For example, suppose that asset 310 is being used in task 320 in some category. Application 302 determines that a future task after task 320 in tool 318 can be optimized using asset 322. Accordingly, application 302 includes in reference 312, block 324. Block 324 is a "next" block, which includes link or reference 326 to asset 322. Strength 328 is a strength of the next link—link 326—between asset 310 and asset 322. Probability 330 is the likelihood that asset 322 will be needed after task 320 in a plan being managed by tool 318. Temporal distance 332 is an amount of time or a number of intervening tasks between the use of asset 310 in task 320 and the predicted use of asset 322 in the future task. Any number of next blocks similar to block 324 can be included with reference 312.

Just as a reference to an asset can be categorized into a category, a next link essentially includes a reference to another asset, and therefore can be similarly categorized into a category. In one embodiment, next link 326 may be categorized in a special category that links two different categories, i.e., that links the assets in different categories. For example, suppose that asset 310 belongs to category E and asset 322 belongs to category A. Next link 326 links category E to category A as shown.

Application 302 may also include in reference 312, block 334. Block 334 is a "previous" block, which includes link or reference 336 to asset 323. Strength 338 is a strength of the previous link—link 336—between asset 310 and asset 323. Probability 340 is the likelihood that asset 310 will be needed in task 320 after some previous task that used asset 323 in a plan being managed by tool 318. Temporal distance 342 is an amount of time or a number of intervening tasks between the use of asset 323 in that previous task and the use of asset 310 in task 320. Any number of previous blocks similar to block 334 can be included with reference 312.

Just as a reference to an asset can be categorized into a category, a previous link essentially includes a reference to a previous asset, and therefore can be similarly categorized into a category. In one embodiment, previous link 336 may be categorized in a special category that links two different categories, i.e., that links the assets in different categories. For example, suppose that asset 310 belongs to category E and asset 323 belongs to category C. Previous link 336 links category C to category E as shown.

With reference to FIG. 4A, this figure depicts a block diagram of a method for managing reuse of assets in a workflow management system in accordance with an illustrative embodiment. Application 402 is an example of application 302 in FIG. 3. Component 404 is an example of component 304, and component 406 is an example of component 306 in FIG. 3. Task information 408 is an example of task information 322 in FIG. 3.

Component 404 performs categorization of a reusable asset using one or more experience reports associated therewith, in a manner described herein. Upon receiving task information 408, component 406 performs a task mapping operation.

Specifically, subcomponent 410 determines one or more categories corresponding to the task of information 408. In some cases, a task management tool, such as tool 318 in FIG. 3, may provide one or more category identifiers with information 408. In some other cases, information 408, e.g., a task specification, can be analyzed to determine a category of the corresponding task.

Subcomponent 412 analyzes the experience reports associated with various reusable assets to identify previously performed tasks that were similar to the task of information 408 according to some similarity factor. Some non-limiting example similarity factors to regard two tasks as similar include, performing a similar function or operation in the workflow management system, performing a similar function or operation in a software product, participating in the same or similar software product or development plan, performed or created by the same user or team, using same or similar software or hardware resources in the workflow management system, using the previous task to build the future task, and many others.

If subcomponent 412 identifies a previous task that is similar to the task of information 408, subcomponent 414 constructs an asset collection from the reusable assets that were used in the similar previous task. If more than one similar previous tasks are found, more than one collection can be created. In some cases, it may be possible to construct more than one collection from a single similar previous task.

When subcomponent 414 produces an asset collection, subcomponent 416 encapsulates the collection into an asset form. The encapsulated asset includes all the reusable assets in the collection and a set of encapsulated experience reports as described herein.

Asset collections 418 (A1) through 420 (Ax) are examples of asset collections encapsulated in this manner. For example, if a collection identified by subcomponent 414 includes asset R1, that asset R1 together with all, some, or none of its corresponding experience reports (E1) is included in encapsulated asset A1, which represents the collection. Note that experience reports in E1 are separate from and in addition to any experience reports that may be extracted from the experience reports of R1 and included in encapsulated experience reports of A1 (EE1). EE1 pertain to the usage of the collection in the similar previous task. In this manner example A1 comprises R1-E1, R3-E3, . . . , Rn-En, and EE1, where R1, R3, . . . , Rn are example assets from the collection. Similarly, if another collection is identified, corresponding encapsulated asset (Ax) comprises R1-E1, R5-E5, . . . , Rp-Ep, and encapsulated experience reports of Ax (EEx), where R1, R5, . . . , Rp are example assets from the other collection.

A priority of an encapsulated asset, e.g., of A1 or Ax, can be computed using their respective encapsulated experience reports, e.g., EE1 or EEx, respectively, in a manner described herein. The computed priority can be associated with the encapsulated asset. Furthermore, a separate experience report can be associated with the asset collection itself, such that collections can be recursively nested and evaluated/prioritized with respect to each other in the context of the category of tasks within which they are typically used. The priority computation can be configured to take into account such separate experience reports in a manner similar to EE1 or EEx as described herein.

Alternatively, when subcomponent 412 identifies distinct reusable assets—whether in lieu of or in addition to a collection of reusable assets—subcomponent 414 computes their priorities for their respective categories. For example, asset 422 may be asset R1 together with its corresponding set of experience reports (E1), and a computed priority for each of one or more categories in which asset R1 can be categorized. Similarly, any number of individual assets may be identified, e.g., asset 424 may be asset Rj together with its corresponding set of experience reports (Ej), and a computed priority for each of one or more categories in which asset Rj can be categorized.

Depending on the particular use-case, application 402 outputs prioritized assets 422-424, prioritized encapsulated assets 418-420, or some combination thereof to the task management tool that supplied information 408. The tool provides a selection input, which selects one or more of the outputs, for example, some combination of outputs 418-420 and 422-424. Component 426 detects or receives the selection. Component 426 enables the task being planned in the tool, or causes the tool to enable the task, to become associated with the selected asset or assets in a selected collection/encapsulated asset.

Component 428 begins collecting experience data from the task about an asset associated with the task. Component 428 adds or modifies, or enables the addition or modification of, the experience reports of the associated asset using the collected experience data.

Component 404 which initially categorized an asset dynamically detects any changes to the experience reports that form the basis of the categorization. The addition or modification of an experience report of an asset thus causes component 404 to re-evaluate the asset categories, and may cause component 404 to dynamically change or recategorize the asset.

Figure 4B:
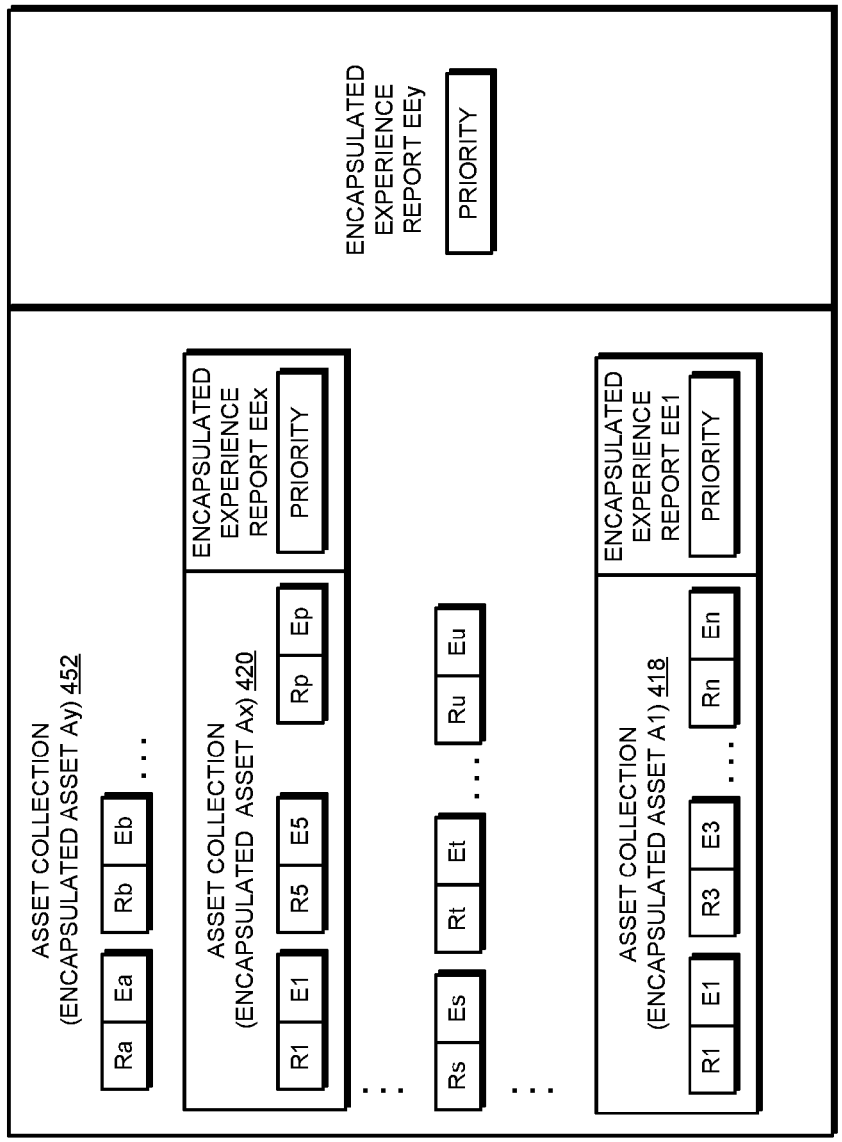
FIG. 4B depicts a nested encapsulated asset in accordance with an illustrative embodiment.

With reference to FIG. 4B, this figure depicts a nested encapsulated asset in accordance with an illustrative embodiment. Asset collection 452 (Ay) can be output from application 402 of FIG. 4A in a manner similar to asset collections 418 (A1) through 420 (Ax).

For example, encapsulated asset Ay may include any number of individual assets e.g., asset Ra, together with all, some, or none of its corresponding experience reports (Ea). [Rb, Eb], [Rs, Es], [Rt, Et], and [Ru, Eu] are some more individual assets and some or all of their experience reports are similarly included in encapsulated asset Ay.

Encapsulated asset Ay may also include other encapsulated assets. In other words, just as an individual asset can be included in an encapsulated asset, an encapsulated asset can be treated as just another asset and nested within another encapsulated asset. In the depicted example, Ay 452 is shown to have nested therein encapsulated assets A1 418 and Ax 420 of FIG. 4A. Any number of assets and encapsulated assets can be nested in this manner, and any number of nesting levels can be created within the scope of the illustrative embodiments. As described with respect to FIG. 4A, the experience reports of Ay (EEy) are separate from and in addition to any experience reports that may be extracted from the experience reports of an included individual or encapsulated asset. EEy pertain to the usage of the Ay collection in a similar previous task.

Figure 4C:
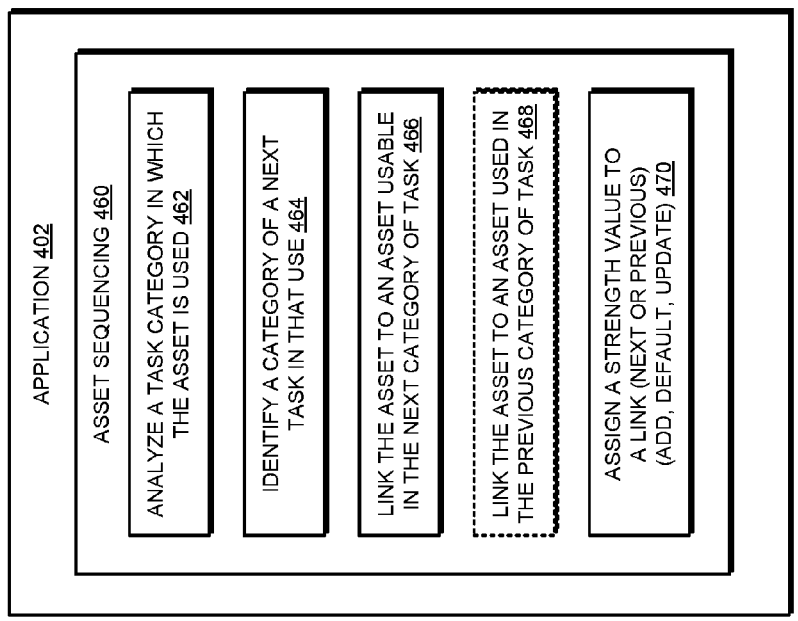
FIG. 4C depicts a block diagram of an asset sequencing component in accordance with an illustrative embodiment.

With reference to FIG. 4C, this figure depicts a block diagram of an asset sequencing component in accordance with an illustrative embodiment. Application 402 is the same as application 402 in FIG. 4A and includes asset sequencing component 460.

Component 460 includes subcomponent 462, which analyzes a task category in which an asset is used in a present use, e.g., in a present plan. Subcomponent 464 identifies a category of a next task that is likely to occur in the present use. As described herein, subcomponent 464 identifies the next task through an analysis of a previous task history.

Subcomponent 466 links the asset being used to an asset that is usable in the category of the next task. For example, subcomponent 466 constructs a next block associated with the in-use asset, in which the subcomponent 466 resolves a reference to the other asset and creates a link to the other asset. Subcomponent 468 optionally constructs a previous block in the other asset that is linked in the next block by subcomponent 466.

Subcomponent 470 computes a strength of the link between the assets, computes a probability that the other asset will be needed after the in-use asset, and computes a temporal distance at which the other asset is likely to be needed. Subcomponent 470 adds the computed information to the next block, and optionally to the previous block.

Figure 5:
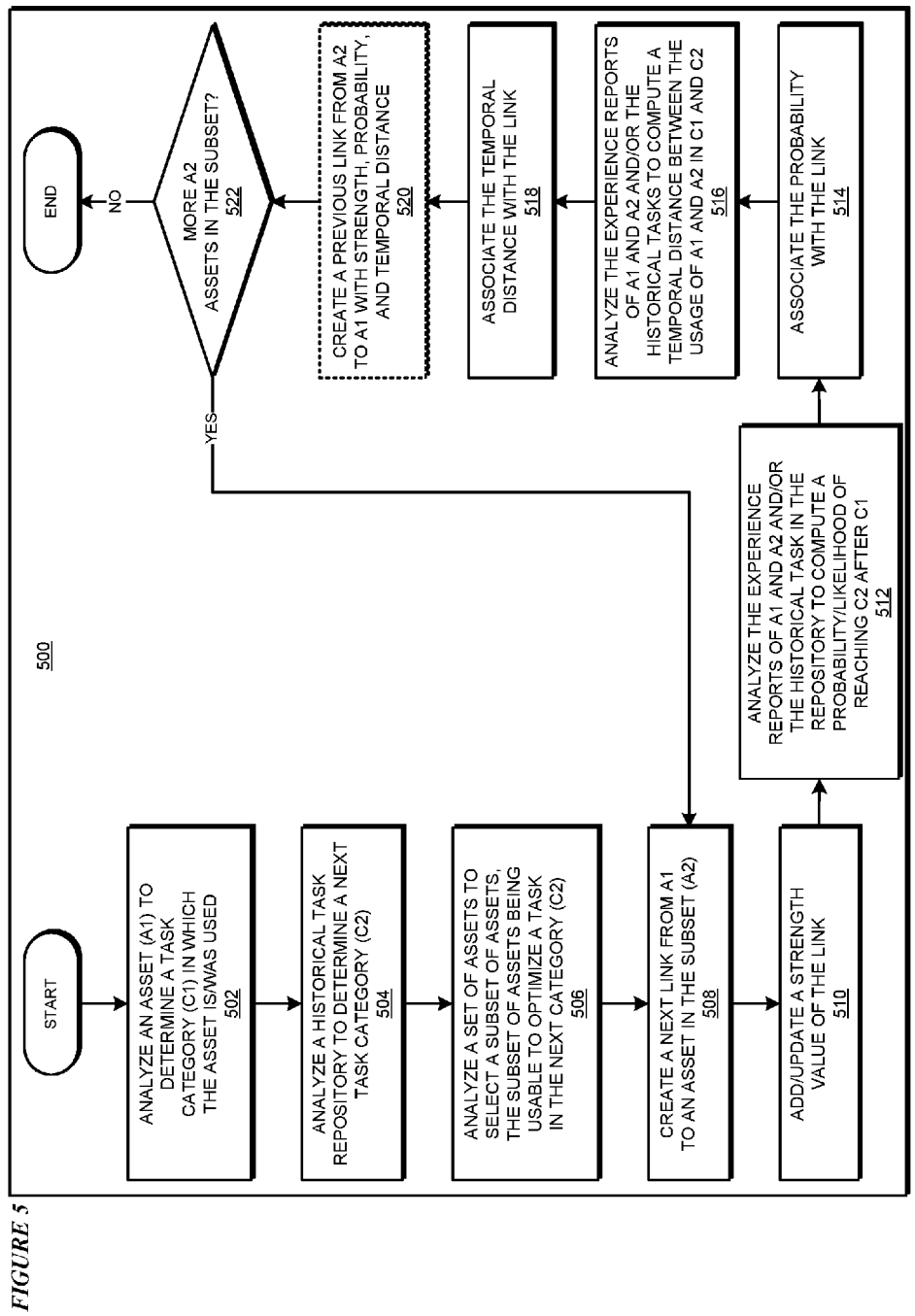
FIG. 5 depicts a flowchart of an example process for asset sequencing in accordance with an illustrative embodiment.

With reference to FIG. 5, this figure depicts a flowchart of an example process for asset sequencing in accordance with an illustrative embodiment. Process 500 can be implemented in application 402 in FIG. 4C.

The application analyzes an asset (A1) to determine a category (C1) of tasks in which A1 is used (block 502). The application analyzes a historical tasks repository to determine a category (C2) of a next task that is likely to follow a task of category C1 (block 504).

The application analyzes a set of assets to select a subset of assets that is usable in optimizing a task in category C2 (block 506). The application creates a next link from A1, to an asset (A2) in category C2, i.e., from a reference of A1 to a reference of A2 (block 508).

The application computes a strength of the link created in block 508 and updates the link with the computed strength (block 510). The application analyzes the experience reports of A1 and A2, the historical tasks in the repository, or both, to compute a probability of reaching a task of category C2 after a task of category C1 (block 512). The application associates the computed probability with the link as well (block 514).

The application analyzes the experience reports of A1 and A2, the historical tasks in the repository, or both, to compute a temporal distance between the usage of A1 and A2 (block 516). The application associates the computed temporal distance with the link as well (block 518).

Optionally, the application creates a previous link from A2 to A1 and populates that previous link with the strength, probability, and temporal distance data (block 520).

The application determines whether more assets like A2 remain in the subset to be linked in this manner (block 522). If more assets like A2 remain in the subset to be linked with A1 ("Yes" path of block 522), the application returns process 500 to block 508. If no more assets like A2 remain in the subset to be linked ("No" path of block 522), the application ends process 500 thereafter.

Figure 6:
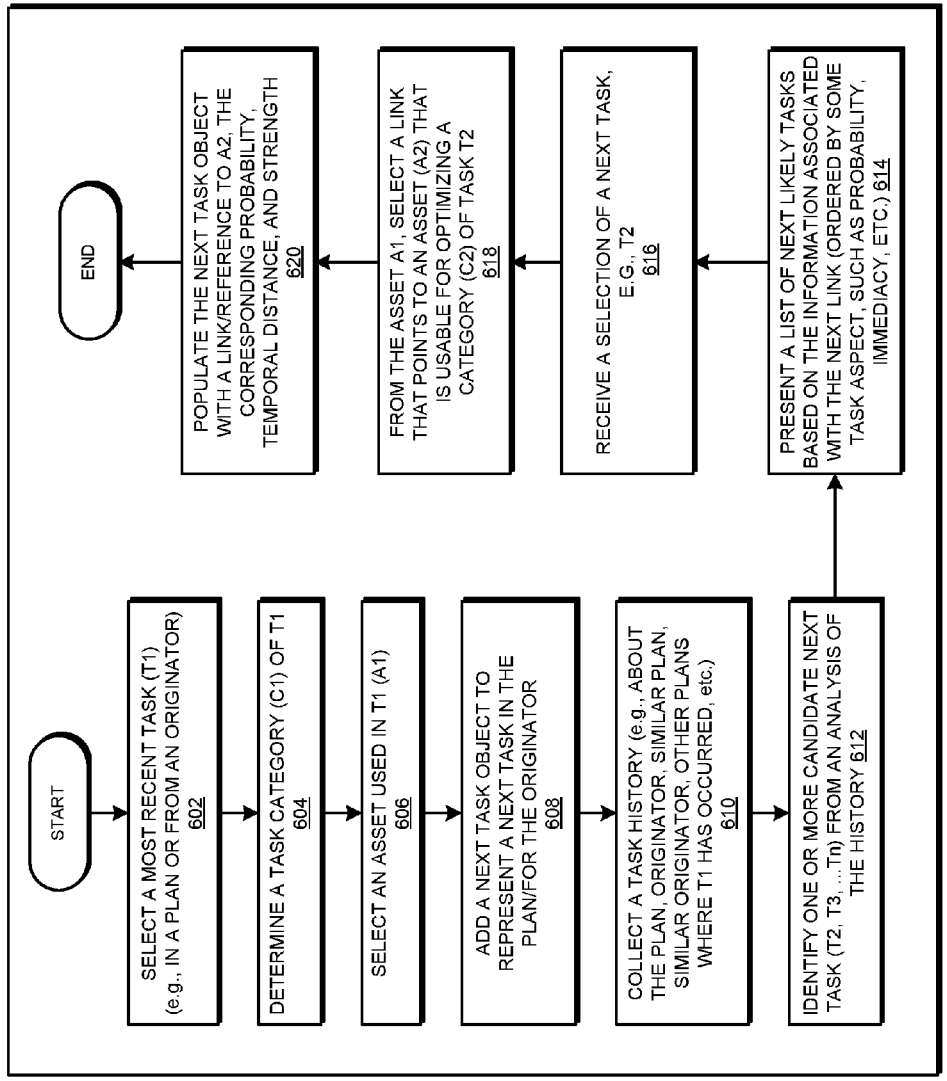
FIG. 6 depicts a flowchart of an example process for predictive optimization of next task through asset reuse in accordance with an illustrative embodiment.

With reference to FIG. 6, this figure depicts a flowchart of an example process for predictive optimization of next task through asset reuse in accordance with an illustrative embodiment. Process 600 can be implemented in application 402 in FIG. 4C.

The application selects a most recent task (T1), e.g. a task being performed at a current time according to a task management tool or task originator (block 602). The application determines a task category (C1) of T1 (block 604).

The application selects an asset (A1) that is used in T1 (block 606). The application adds a next task object, e.g., in a task plan where the task being performed at the current time is managed (block 608). The application collects a task history, e.g., previously performed tasks from a historical tasks repository as described herein (block 610).

The application identifies one or more candidate next tasks (T2, T3, . . . Tn, etc.) from an analysis of the history (block 612). The application presents the selection of possible next tasks to a user, optionally arranged according to some suitable aspect of the tasks (block 614). For example, the possible next tasks may be arranged by their respective probabilities, immediacy, or some other aspect important to the user.

The application receives a selection input, using which the user selects one or the possible next tasks, e.g., task T2 (block 616). The application selects a next link from A1 that points to an asset (A2) which is usable for optimizing a category (C2) of candidate next task T2 (block 618).

The application populates the next task object with the link or reference to A2, and any corresponding link strength, probability, and/or temporal distance information that may be associated with the link (block 620). The application ends process 600 thereafter.

Thus, a computer implemented method, system or apparatus, and computer program product are provided in the illustrative embodiments for predictive optimization of next task through asset reuse. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of generating computer-usable code, the method comprising:
   determining a first task being performed at a given time, wherein the first task is in a first category of tasks;
   identifying a first asset that is configured for use with the first category of tasks;
   constructing a next task object;
   identifying, by analyzing a set of tasks that were performed during a period prior to the given time, one or more candidate next tasks, wherein one or more candidate next tasks are determined to be in a second category of tasks by computing a probability value as a function of a number of times a task in the second category has occurred after the task in the first category;
   receiving a selection of a particular candidate next task based on the identified one or more candidate next tasks:
   generating one or more links to one or more additional assets, wherein each of the one or more links are:
      configured for use with the second category of tasks; and
      associated with a respective probability value a respective additional asset will be needed;
   selecting a particular link from the one or more links based on each of the respective probability values;
   populating the next task object with the selected particular link; and
   automatically generating computer-usable code based on the populated next task object and selected particular link.

2. The method of claim 1, further comprising:
   analyzing the set of tasks to determine the second category;
   analyzing a set of assets to determine that the second asset is usable in a task of the second category;
   creating, in the first asset, a next link to the second asset from the first asset, wherein the link is the next link;

computing a strength value of the next link; and
associating, in the first asset, the strength value with the next link.

3. The method of claim 2, further comprising:
analyzing the set of tasks to determine a number of times a task in the second category has occurred after a task in the first category; and
computing the strength value by applying a function to the number of times.

4. The method of claim 2, further comprising:
analyzing the set of tasks to determine a number of times a task in the second category has occurred after a task in the first category relative to a total number of times a task of any available category have occurred after the task in the first category;
computing a probability value of the next link by applying a function to a fraction of the number of times over the total number of times; and
associating, in the first asset, the probability value with the next link.

5. The method of claim 2, further comprising:
analyzing the set of tasks to determine an amount of time elapsed between a task in the first category and a task in the second category; and
associating with the next link, in the first asset, the amount of time as a temporal distance.

6. The method of claim 2, further comprising:
analyzing the set of tasks to determine a number of other tasks occurring between a task in the first category and a task in the second category; and
associating with the next link, in the first asset, the number of other tasks as a temporal distance.

7. The method of claim 1, wherein the use of the second asset with the second category comprises an optimization of the second task.

8. The method of claim 7, wherein the optimization comprises reducing an execution time of the second task.

9. The method of claim 7, wherein the optimization comprises eliminating the second task.

10. The method of claim 1, wherein the link to the second asset is within a first reference object, the first reference object referring to the first asset.

11. The method of claim 1, further comprising:
creating, as a part of the constructing, the next task object in a task management tool, wherein the task management tool manages the performance of the first task according to a task plan, and wherein the next task is not planned in the plan at the given time.

12. The method of claim 1, wherein the first asset is in use in the first task at the given time.

13. The method of claim 1, wherein the method is embodied in a computer program product comprising one or more computer-readable storage devices and computer-readable program instructions which are stored on the one or more computer-readable tangible storage devices and executed by one or more processors.

14. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

15. A computer usable program product comprising one or more computer-readable storage devices, and program instructions stored on at least one of the one or more storage devices, the stored program instructions comprising:
program instructions to determine a first task being performed at a given time, wherein the first task is in a first category of tasks;
program instructions to identify a first asset that is configured for use with the first category of tasks;
program instructions to construct a next task object;
program instructions to identify, by analyzing a set of tasks that were performed during a period prior to the given time, one or more candidate next tasks, wherein one or more candidate next tasks are determined to be in a second category of tasks by computing a probability value as a function of a number of times a task in the second category has occurred after the task in the first category;
program instructions to receive a selection of a particular candidate next task based on the identified one or more candidate next tasks;
program instructions to generate one or more links to one or more additional assets, wherein each of the one or more links are:
configured for use with the second category of tasks; and
associated with a respective probability value a respective additional asset will be needed;
program instructions to select a particular link from the one or more links based on each of the respective probability values;
program instructions to populate the next task object with the selected particular link; and
program instructions to automatically generate computer-usable code based on the populated next task object and selected particular link.

16. The computer usable program product of claim 15, further comprising:
program instructions to analyze the set of tasks to determine the second category;
program instructions to analyze a set of assets to determine that the second asset is usable in a task of the second category;
program instructions to create, in the first asset, a next link to the second asset from the first asset, wherein the link is the next link;
program instructions to compute a strength value of the next link; and
program instructions to associate, in the first asset, the strength value with the next link.

17. The computer usable program product of claim 16, further comprising:
program instructions to analyze the set of tasks to determine a number of times a task in the second category has occurred after a task in the first category; and
program instructions to compute the strength value by applying a function to the number of times.

18. The computer usable program product of claim 16, further comprising:
program instructions to analyze the set of tasks to determine a number of times a task in the second category has occurred after a task in the first category relative to a total number of times a task of any available category have occurred after the task in the first category;
program instructions to compute a probability value of the next link by applying a function to a fraction of the number of times over the total number of times; and
program instructions to associate, in the first asset, the probability value with the next link.

19. The computer usable program product of claim 16, further comprising:

program instructions to analyze the set of tasks to determine an amount of time elapsed between a task in the first category and a task in the second category; and program instructions to associate with the next link, in the first asset, the amount of time as a temporal distance.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to determine a first task being performed at a given time, wherein the first task is in a first category of tasks;

program instructions to identify a first asset that is configured for use with the first category of tasks;

program instructions to construct a next task object;

program instructions to identify, by analyzing a set of tasks that were performed during a period prior to the given time, one or more candidate next tasks, wherein one or more candidate next tasks are determined to be in a second category of tasks by computing a probability value as a function of a number of times a task in the second category has occurred after the task in the first category;

program instructions to receive a selection of a particular candidate next task based on the identified one or more candidate next tasks;

program instructions to generate one or more links to one or more additional assets, wherein each of the one or more links are:

configured for use with the second category of tasks; and associated with a respective probability value a respective additional asset will be needed;

program instructions to select a particular link from the one or more links based on each of the respective probability values;

program instructions to populate the task object with the selected particular link; and program instructions to automatically generate computer-usable code based on the populated next task object and selected particular link.

\* \* \* \* \*